Patented Feb. 8, 1949

2,460,803

UNITED STATES PATENT OFFICE 2,460,803

DISUBSTITUTED DESOXYALDITOLS AND PROCESS FOR THEIR PREPARATION

William Andrew Bonner, Hubbard Woods, and Charles D. Hurd, Evanston, Ill., assignors to Corn Products Refining Company, New York, N. Y., a corporation of New Jersey No Drawing. Application December 31, 1945, Serial No. 638,584

13 Claims. (Cl. 260—618)

This invention relates to a new series of organic chemical compounds, disubstituted desoxyalditols. More particularly it relates to 1-R-1-R'-1-desoxyalditols and their derivatives and to a process for their preparation.

The general formula for the compounds produced by the process of this invention may be represented as follows:

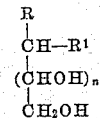

wherein R may be an alkyl, aryl, or aralkyl group and R' is an aryl group; and n is a whole number, usually 3 or 4.

A specific example of a 1-R-1-R'-1-desoxyalditol produced by means of our invention is 1,1-diphenyl-1-desoxy-D-glucitol. This may be represented by the following structural formula:

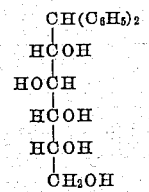

A specific example of a derivative of a 1-R-1-R'-1-desoxyalditol obtained by the process of the present invention is 1,1-diphenyl-1-desoxy-2,3,4,5,6 pentaacetyl-D-glucitol. This may be represented by the following structural formula:

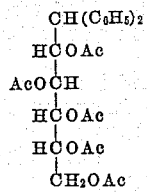

Further examples of 1-R-1-R'-1-desoxyalditols produced by the process of the present invention are Beta-1-p-tolyl-alpha - 1 - phenyl - 1 - desoxy-D-glucitol
Alpha-1-p-tolyl-beta - 1 - phenyl - 1 - desoxy-D-glucitol
1,1-diphenyl-1-desoxy-D-xylitol
1,1-di-p-tolyl-1-desoxy-D-xylitol
Beta-1-phenyl-alpha - 1 - p-tolyl - 1 - desoxy-D-xylitol
Alpha-1-phenyl-beta - 1 - p-tolyl - 1 - desoxy-D-xylitol An object of the invention is to provide a new class of compounds having the general formula above described. A further object is to provide a process for making such compounds.

These objects are accomplished by bringing about the reaction between a 1-R-1-desoxyglycose, wherein R may represent an aryl, alkyl, or aralkyl radical, and an aromatic hydrocarbon or specific substitution product thereof in the presence of anhydrous aluminum chloride as a catalyst.

The above reaction will be recognized as an extension of the Friedel-Crafts reaction. While such reaction is well known it has not been applied to 1-R-desoxyglycoses to produce 1-R-1-R'-1-desoxyalditols.

The reaction is believed to proceed according to the following illustrative equation involving the use, in this instance of a derivative of a 1-R-1-desoxyglycose:

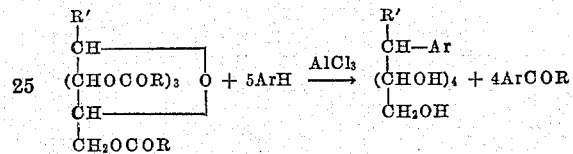

wherein R' may be an alkyl, aryl, or aralkyl group; Ar is an aryl group; and R is an alkyl group. The >CHOH groups represented in the formula of the desoxyalditol actually do not appear until water has been added to isolate the desired products, as will be described later. They are probably held by the aluminum chloride in the following manner →CHOAlCl$_2$.

In carrying out the present invention there may be used as one of the reactants any 1-R-1-desoxyglycose wherein R may be an alkyl, aryl, or aralkyl group, or, preferably, any such 1-R-1-desoxyglycose in the form of its acyl or similar derivative. Such compounds and the processes for their preparation are the subjects of co-pending applications, Serial No. 638,583, filed December 31, 1945, and Serial No. 638,585, filed December 31, 1945.

Examples of 1-R-1-desoxyglycose derivatives which are suitable for purposes of the present invention include 2,3,4,6-tetraacetyl-beta-D-glucosylbenzene, 2,3,4-triacetyl-beta-D-xylosyl-benzene, p-(2,3,4-triacetyl-beta-D-xylosyl) toluene, p-(2,3,4,6-tetraacetyl-beta-D-glucosyl) toluene.

In carrying out the invention both substituted and unsubstituted aromatic hydrocarbons may be used. Among the aromatic hydrocarbons which may be used in the process of the present invention are benzene, toluene, xylene, naphthalene. Compounds such as bromobenzene, anisole, thiophene and the like may be used also. In fact any of the type of unsubstituted or substituted aromatic hydrocarbons which are known to undergo the Friedel-Crafts reaction in general may also be used here. As the term hydrocarbon is used herein in the description and claims, it is intended to refer to both substituted and unsubstituted hydrocarbons.

In carrying out the process of the present invention, the 1-R-1-desoxyglycose derivative is mixed with an excess of an aromatic hydrocarbon or substitution product thereof and to this mixture is added anhydrous aluminum chloride. This mixture is heated with stirring until the reaction is complete. Hydrogen chloride gas is evolved copiously at first but subsides as the reaction continues. During the reaction the aluminum chloride changes from a powder to a light gum and eventually dissolves in the aromatic hydrocarbon which in addition to being one of the reactants also serves as the medium for the reaction. After the reaction is complete, the mixture is allowed to cool and is then mixed with several volumes of cold water. This treatment causes the disappearance of the CHOAlCl$_2$ complexes and the appearance of the CHOH groups in the desired compounds. Two layers are formed, an aqueous layer and a non-aqueous layer. These are separated in any suitable manner. The desired 1-R-1-R'-1-desoxyalditol is found in the aqueous layer. The catalyst, now in the form of a soluble aluminum salt, is also present in this layer. The aromatic ketone, i. e., the ArCOR in the above equation together with the excess hydrocarbon and higher boiling, tarry products appear in the non-aqueous layer. The ketone may be separated from the non-aqueous layer and purified by vacuum distillation or other suitable means. The excess of aromatic hydrocarbon may be recovered in similar manner.

The recovery of the desired 1-R-1-R'-1-desoxyalditol from the aqueous layer is effected by first adjusting the pH value of said layer to about 7.0 with an alkaline agent. This treatment produces aluminum hydroxide which is removed by filtration or the like. The remaining filtrate is then treated for the removal of water therefrom, as by distillation or the like under diminished pressure. There then remains a dark colored sirup. In addition to the desired product, this sirup contains inorganic salts.

The 1-R-1-R'-1-desoxyalditol may be recovered from the sirup by first dissolving the sirup in as small an amount of hot water as will effect such dissolution. Upon cooling of the resultant solution crystals of the 1-R-1-R'-1-desoxyalditol form and may be removed and dried in conventional manner. Further purification may be effected by recrystallization of the crystals from water.

Alternately, the 1-R-1-R'-1-desoxyalditol may be recovered from the sirup in the form of a suitable derivative, such as the acetate derivative. In such case, the sirup is acetylated in known manner with acetic anhydride. After hydrolysis of the excess acetic anhydride, the acetylated product is recovered by extraction from the products of the hydrolysis with a suitable solvent, such as ethyl ether. Removal of the solvent leaves the acetate of the 1-R-1-R'-1-desoxyalditol, in solid or sirupy form. If it is desired to purify the acetylated product further, this may be effected by treating the same in conventional manner with a suitable solvent, such as 2-propanol. Deacetylation of the acetylated compound with methanol and sodium in conventional manner yields the 1-R-1-R'-1-desoxyalditol in the methanol solution. Removal of the methanol, as by distillation, leaves the 1-R-1-R'-1-desoxyalditol in solid form.

The process of the present invention may be carried out in any reaction vessel which is equipped with means for agitation, means to allow for the escape of hydrogen chloride gas as it is evolved, and also means to allow the reaction mixture to be maintained at suitable reaction temperatures without the loss of the reactants.

The temperature at which the reaction mixture should be heated will depend upon the ingredients therein, but in general should not exceed about 100° C. Generally, temperatures equivalent to those obtained by heating the reaction mixture on a steam bath are satisfactory.

Each of the reactants and also the catalyst should be in anhydrous form in order to carry out the reaction properly. The commercial grade of anhydrous aluminum chloride used for catalytic purposes is satisfactory for purposes of the present invention. It is preferable to add the bulk of the catalyst, if not all, at the beginning of the process.

The amount of aluminum chloride which is used as catalyst in the present invention will depend upon the form in which the 1-R-1-desoxyglocose is used. If, for example, an acyl derivative of the desoxyglycose is used as one of the reactants, the acyl groups thereof will also react with the catalyst, as previously indicated. In such case there must be sufficient catalyst to provide at least one molecular equivalent of catalyst for the pyranose or furanose ring after the acyl groups are satisfied. The amount of catalyst necessary when an acyl derivative of a 1-R-1-desoxyglycose is one of the reactants is $2x + 1$ molecular equivalents, wherein $x$ equals the number of acyl groups. For example, if tetraacetyl-D-glucopyranosylbenzene were one of the reactants, nine molecular equivalents of aluminum chloride should be used for each mole of such desoxyglycose. Some substituent groups may require only one molecular equivalent of catalyst while others may not require any. In any case, however, it is necessary to provide sufficient catalyst so that the desired reaction may be effected. Considerably larger amounts of aluminum chloride than above specified may be used also, although there is no particular advantage to be gained.

The time required for the reaction to take place will depend somewhat upon the individual reactants present, but generally a period of heating under conditions as above described for 4 to 8 hours is satisfactory.

An excess of the aromatic hydrocarbon should be used if the hydrocarbon is intended to serve as the reaction medium. Generally, the excess should be equal to at least about 60 times the amount of the hydrocarbon actually undergoing reaction. As already mentioned, the excess hydrocarbon may be recovered. Other solvents, such as carbon disulfide, which are known to serve as reaction media for the Friedel-Crafts reaction may also be used here for such purpose.

The 1-R-1-desoxyglycose should be at least partially, if not completely soluble in the aromatic hydrocarbon with which reaction is to be effected, or in a common solvent for both reactants which may serve as a reaction medium. The introduction of substituent groups, such as acyl, alkyl and the like, is an effective means of imparting the desired solubility characteristics to the desoxyglycose.

The amount of water added to decompose the aluminum complex should preferably be large enough to dissolve the desired dissubstituted desoxyalditol. To isolate the desired product readily, this should be dissolved in the water layer. Since, however, the desired product may in some instances be less soluble than in others, the water added should in all cases be added in amount sufficient to effect the desired dissolution.

Various alkaline agents may be used to adjust the pH value of the aforementioned water layer. Among the alkaline agents which are satisfactory are sodium hydroxide, sodium carbonate, potassium hydroxide, ammonium hydroxide and the like.

As already mentioned the 1-R-1-R'-1-desoxyalditol may be purified by recrystallizing the same from water. In some instances such compounds crystallize from water in the form of a hydrate. An example is 1,1-diphenyl-1-desoxy-D-glucitol hydrate.

1-R-1-R'-1-Desoxyalditols may also be isolated from the sirup obtained from the water layer in the form of derivatives other than the acetate, e. g., the propionate, butyrate, and the like. Purification of these may be effected by the use of 2-propanol, methanol, ethanol and the like.

The following examples, which are intended as informative and typical only and not in a limiting sense, will further illustrate the invention, which is intended to be limited only in accordance with the scope of the appended claims.

*Example 1.—Preparation of 1,1-diphenyl-1-desoxy - D - glucitol.*—Tetraacetyl-beta-D-glucopyranosylbenzene (4.00 g.) was dissolved in dry benzene (150 ml.), and anhydrous aluminum chloride (13 g.) was added. The mixture was contained in a three-necked flask equipped with mercury seal, stirrer and reflux condenser, and was stirred under gentle reflux for six hours. After this, the mixture was cooled, poured into 500 ml. of cold water, stirred for one-half hour, and the layers separated and handled individually.

The benzene layer was washed several times with water, filtered, and dried over sodium sulfate. Removal of the solvent yielded 3.8 g. of an aromatic oil which was fractionated at atmospheric pressure through a small modified Claisen flask. The middle fraction (1.7 g., B. P. 198–202° C.) was identified as acetophenone.

The water layer, after being washed with benzene and being combined with the washings of the original benzene layer, was neutralized with sodium hydroxide to a pH value of about 7.0 and filtered free of the precipitated aluminum hydroxide. The cake was washed twice by suspending it in water, boiling the suspension, and filtering the same, the washings being combined with the original filtrate. The combined filtrate and washings were distilled to dryness in vacuo, and the residue removed, air-dried and powdered. It was then returned to the same flask, and acetylated by adding thereto acetic anhydride (250 ml.) and sodium acetate (20 g.) and heating the mixture with stirring on a steam bath for four hours. The acetylation mixture was cooled, poured into 400 ml. of cold water, stirred for two hours, then extracted with ether. The ether solution was washed with water, then with dilute sodium hydroxide solution, finally with water, and then dried. It was clarified by filtering it through decolorizing carbon. Removal of the solvent left 3.5 g. (66%) of crude, amber syrup. This was dissolved in hot 2-propanol and the solution allowed to cool. The crystalline product thereby obtained was identified as 1,1-diphenyl-1-desoxy-2,3,4,5,6-pentaacetyl-D-glucitol, M. P. 93–95° C.

A one gram sample of the last mentioned compound was dissolved in methanol (20 ml.) and a small chip of sodium added. In several minutes the flask was filled with crystals, and after an hour these were collected, washed with methanol, and dried. The yield was 0.54 g. (88%) of 1,1-diphenyl-1-desoxy-D-glucitol. This compound upon purification from water formed a hydrate, the melting point thereof being 155–156.5° C. Oxidation of either above compound with alkaline permanganate produced p-benzoylbenzoic acid.

*Example 2.—Preparation of beta - 1 - phenyl-alpha-1-p-tolyl-1-desoxy - D - glucitol.*—The procedure in this example was essentially the same as in Example 1. The amounts of reactants and catalyst were 1-phenyl-1-desoxy-2,3,4,6-tetraacetyl-beta-
  D-glucose _____grams__ 4.0
Toluene (dry) _____milliliters__ 130
Aluminum chloride (anhydrous)___grams__ 13.0

The mixture was heated for 5 hours at 77–83° C.

From the toluene layer after recovery of the toluene was isolated 3 g. of methyl p-tolyl ketone. Three parts of higher boiling tarry material remained.

The water layer was evaporated as before and acetylated. There was obtained 3.0 g. of an amber sirupy acetate. It was deacetylated directly by placing it in 150 ml. of methanol and adding thereto a little sodium. After 90 minutes the methanol was removed by distillation thereof. The residue was dissolved in as small a volume of hot water as would dissolve the same. The solution was decolorized with decolorizing carbon and allowed to cool. This yielded 0.67 g. of crystals of beta-1-phenyl-alpha-1-p-tolyl-1-desoxy-D-glucitol hydrate. Upon repurification from water the melting point of the compound was found to be 167–170.5° C. and $(\alpha)_D^{25}$, in dioxane, 58.8° (conc. 0.400/100 ml. of dioxane).

*Example 3.—Preparation of beta - 1 - p - tolyl-alpha-1-phenyl-1-desoxy-D - glucitol.*—The procedure used paralleled that of Example 1. The amounts of the compounds used were as follows:

p-(2,3,4,6-tetraacetyl-beta-D-glucopyranosyl)
  toluene _____gram__ 1
Benzene (dry) _____milliliters__ 40
Aluminum chloride (anhydrous)____grams__ 3.0

There was obtained 0.52 g. of sirupy pentaacetate from the water layer. Deacetylation in the manner described in Example 1 resulted in 0.21 g. (27%) of beta-1-p-tolyl-alpha-1-phenyl-1-desoxy-D-glucitol. This crystallized from water as the hydrate. After the hydrate was recrystallized from water three times, the melting point of the hydrate was found to be 151.5–153.5° C. and $(\alpha)_D^{25}$, in dioxane was found to be 55.8° (conc. 0.305 g./100 ml. of dioxane).

*Example 4.—Preparation of 1,1 - diphenyl -1-desoxy-D-xylitol.*—The procedure used was essentially the same as that described in Example 1.

The amounts of the compounds used were as follows:

Triacetyl-beta-D-xylopyranosylbenzene _____ gram__ 1.0
Benzene (dry) _____milliliters__ 40
Aluminum chloride (anhydrous) ___grams__ 3.55

The reflux period was 5 hours.

There was obtained from the water layer 0.42 g. (32%) of clear amber sirup. This on acetylation followed by deacetylation resulted in 1,1-diphenyl-1-desoxy-D-glucitol. This crystallized from water in the form of long needle-shaped crystals, which were determined to be the anhydrous form, M. P. 168.5° C.

*Example 5.—Preparation of beta-1-p-tolyl-alpha-1-phenyl-1-desoxy-D-xylitol.*—One g. of triacetyl-beta-D-xylopyranosyltoluene, 45 ml. of dry benzene, and 3.55 g. of anhydrous aluminum chloride were treated in the manner of the previous example. The yield of amber colored sirupy acetate from the water layer was 0.23 g. (16.4%). After deacetylation and recrystallization from water, fine crystals of beta-1-p-tolyl-alpha-1-phenyl-1-desoxy-D-xylitol (in anhydrous form) were obtained. The melting point of the latter compound was found to be 163.5°–164° C.

We claim:

1. 1-R-1-R'-1-desoxyalditols wherein R represents a radical selected from the group consisting of alkyl, aryl and aralkyl and R' represents an aryl group.

2. The process of preparing disubstituted desoxyalditols which comprises contacting, under substantially anhydrous conditions and at elevated temperature, not exceeding 100° C., a 1-R-1-desoxyglycose, wherein R represents a radical selected from the group consisting of alkyl, aryl and aralkyl, and an aromatic hydrocarbon in the presence of sufficient anhydrous aluminum chloride to effect the desired reaction.

3. The process of preparing disubstituted desoxyalditols which comprises contacting, under substantially anhydrous conditions and at elevated temperature, not exceeding 100° C., an acyl derivative of a 1-R-1-desoxyglycose, wherein R represents a radical selected from the group consisting of alkyl, aryl and aralkyl, and an aromatic hydrocarbon in the presence of at least about $2x+1$ molecular equivalent of anhydrous aluminum chloride with respect to said acyl derivative, wherein $x$ equals the number of acyl groups in said acyl derivative.

4. The process according to claim 2 wherein the time of contact ranges from about 4 to about 8 hours.

5. The process according to claim 3 wherein the time of contact ranges from about 4 to about 8 hours.

6. 1-R-1-R'-1-desoxy-D-glucitols wherein R represents a radical selected from the group consisting of alkyl, aryl, and aralkyl, and R' represents an aryl group.

7. 1-aryl-1-aryl-1-desoxyalditols.

8. 1,1-diphenyl-1-desoxy-D-glucitol.

9. 1,1-diphenyl-1-desoxy-D-xylitol.

10. 1-p-tolyl-1-phenyl-1-desoxy-D-glucitol.

11. The process which comprises effecting the reaction, under substantially anhydrous conditions, between tetraacetyl-D-glucopyranosylbenzene and benzene in the presence of at least 9 molecular equivalents of aluminum chloride, based upon the weight of the tetraacetyl-D-glucopyranosylbenzene; said reaction being effected at elevated temperature, not exceeding about 100° C. and the time for effecting said reaction ranging from about 4 to about 8 hours.

12. The process which comprises effecting the reaction, under substantially anhydrous conditions, between tetraacetyl-D-glucopyranosylbenzene and toluene in the presence of at least 9 molecular equivalents of aluminum chloride, based upon the weight of the tetraacetyl-D-glucopyranosylbenzene; said reaction being effected at elevated temperature, not exceeding about 100° C. and the time for effecting said reaction ranging from about 4 to about 8 hours.

13. The process which comprises effecting the reaction, under substantially anhydrous conditions, between triacetyl-D-xylopyranosylbenzene and benzene in the presence of at least 9 molecular equivalents of aluminum chloride, based upon the weight of the triacetyl-D-xylopyranosylbenzene; said reaction being effected at elevated temperature, not exceeding about 100° C. and the time for effecting said reaction ranging from about 4 to about 8 hours.

WILLIAM ANDREW BONNER.
CHARLES D. HURD.

No references cited.